United States Patent [19]

Romero

[11] 4,410,153
[45] Oct. 18, 1983

[54] BRAKE CONTROL SYSTEM FOR PROVIDING BRAKE RELEASE SIGNALS

[75] Inventor: Ervin G. Romero, Seattle, Wash.

[73] Assignee: The Boeing Company, Seattle, Wash.

[21] Appl. No.: 920,517

[22] Filed: Jun. 29, 1978

[51] Int. Cl.³ ............................................. B64C 25/42
[52] U.S. Cl. ....................................... 244/111; 303/96; 303/97
[58] Field of Search .................... 244/111; 303/93, 96, 303/97

[56] References Cited

U.S. PATENT DOCUMENTS 3,556,614  1/1971  Steigerwald ........................... 303/97
4,007,970  2/1977  Romero ................................ 244/111

Primary Examiner—Reinhard J. Eisenzopf
Attorney, Agent, or Firm—Conrad O. Gardner; Bernard A. Donahue

[57] ABSTRACT

An aircraft brake control system responsive to air-ground condition of the aircraft, nose gear analog wheel speed, and main gear analog wheel speed for providing brake release signals to deactivate main gear wheel braking in the event of the occurrence of any of the following conditions: (1) locked main gear wheel; (2) nose gear wheel is off the ground and main gear wheel is not spinning; (3) nose gear wheel is on the ground but main gear wheel is locked; and (4) nose gear wheel is on the ground but main gear wheel speed is about 50 percent below nose gear wheel speed.

1 Claim, 3 Drawing Figures

BRAKE CONTROL SYSTEM FOR PROVIDING
BRAKE RELEASE SIGNALS

This invention relates to aircraft braking systems and more particularly to locked wheel control in aircraft braking systems.

Heretofore, touchdown protection has operated from main gear squat logic, e.g. see U.S. Pat. Nos. 2,744,699; 2,957,658; 3,711,163; and 3,724,902. Also a combination of main gear squat logic for one pair of main gear wheels and nose gear squat logic for the other pair of wheels has been utilized. Nose wheel speed has been used for anti-skid control reference as seen, e.g. in my U.S. Pat. No. 4,007,970 (FIG. 2 thereof) also assigned to The Boeing Company.

It is accordingly an object of this invention to provide aircraft locked wheel protection utilizing nose gear wheel speed information signals.

It is a further object of this invention to provide circuit means responsive to nose gear squat (air-ground) logic and nose gear wheel speed information signals for preventing main gear wheel lock-up, both before and subsequent to nose gear wheel spin-up after touchdown.

It is another object of this invention to provide means for generating brake release signals for preventing brake pressure application to a braked main gear wheel before the wheel has spun up during touchdown or subsequent to a skid condition.

It is yet another object of this invention to provide means for preventing main gear wheel lock-up under very slick runway conditions, i.e. a smooth surface flooded runway.

A full understanding of the invention, and of its further objects and advantages and the several unique aspects thereof, will be had from the following description when taken in conjunction with the accompanying drawings in which.

Figure 1:
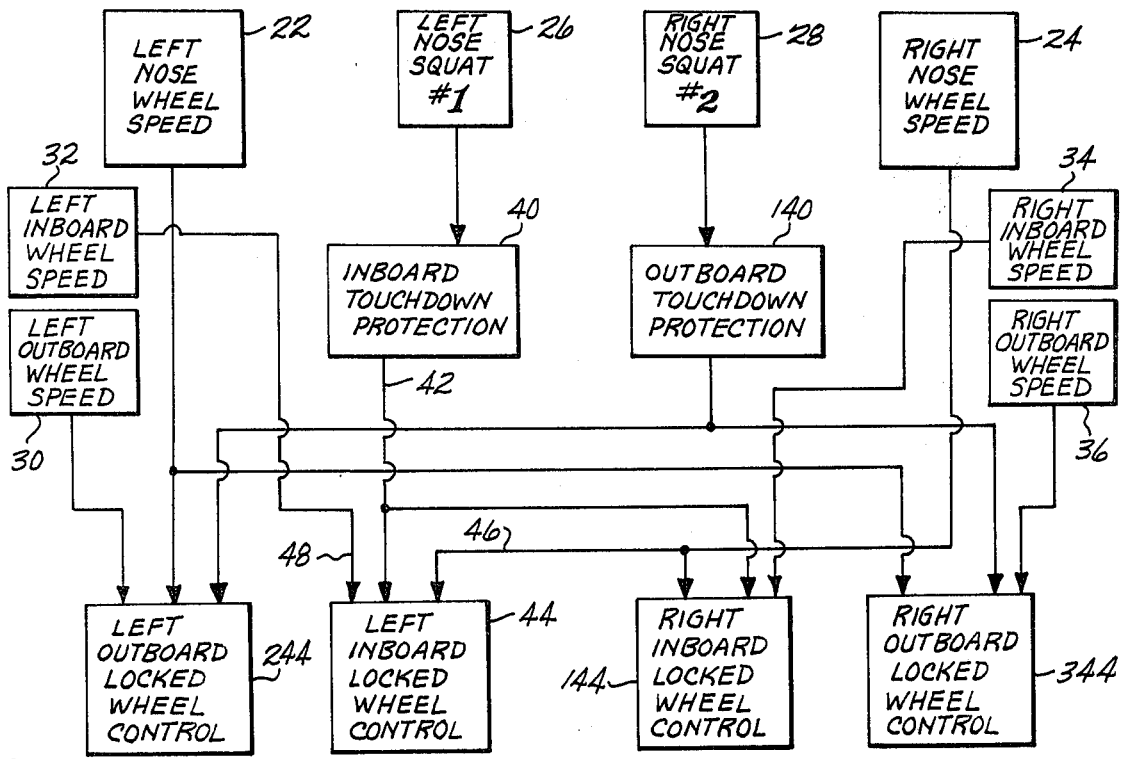
FIG. 1 is a block diagram of the present brake control system for providing locked wheel control in an exemplary aircraft having four main gear wheels.

Turning now to FIG. 1, it can be seen that the present brake control system utilizes left 22 and right 24 nose gear wheel speed generators, left 26 and right 28 nose gear squat switches associated with left and right nose wheels respectively, and left outboard 30, left inboard 32, right inboard 34, and right outboard 36 main gear wheel speed generators. Inboard touchdown protection circuit 40 can be seen as responsive to air ground logic as provided by left nose gear squat switch 26 and provides an output signal 42 that is applied as a first input signal to left inboard locked wheel control circuit 44 (as also seen in the complete circuit schematic of inboard touchdown protection circuit 40 and left inboard locked wheel control circuit 44 in FIG. 2). Left inboard locked wheel control circuit 44 (as noted also in FIG. 2) is provided with a second input signal 46 comprising an analog voltage representative of right nose gear wheel speed developed by right nose gear wheel speed generator 24, and a third input signal 48 comprising an analog voltage representative of left inboard main gear wheel speed developed by left inboard main gear wheel speed generator 32.

Figure 2:
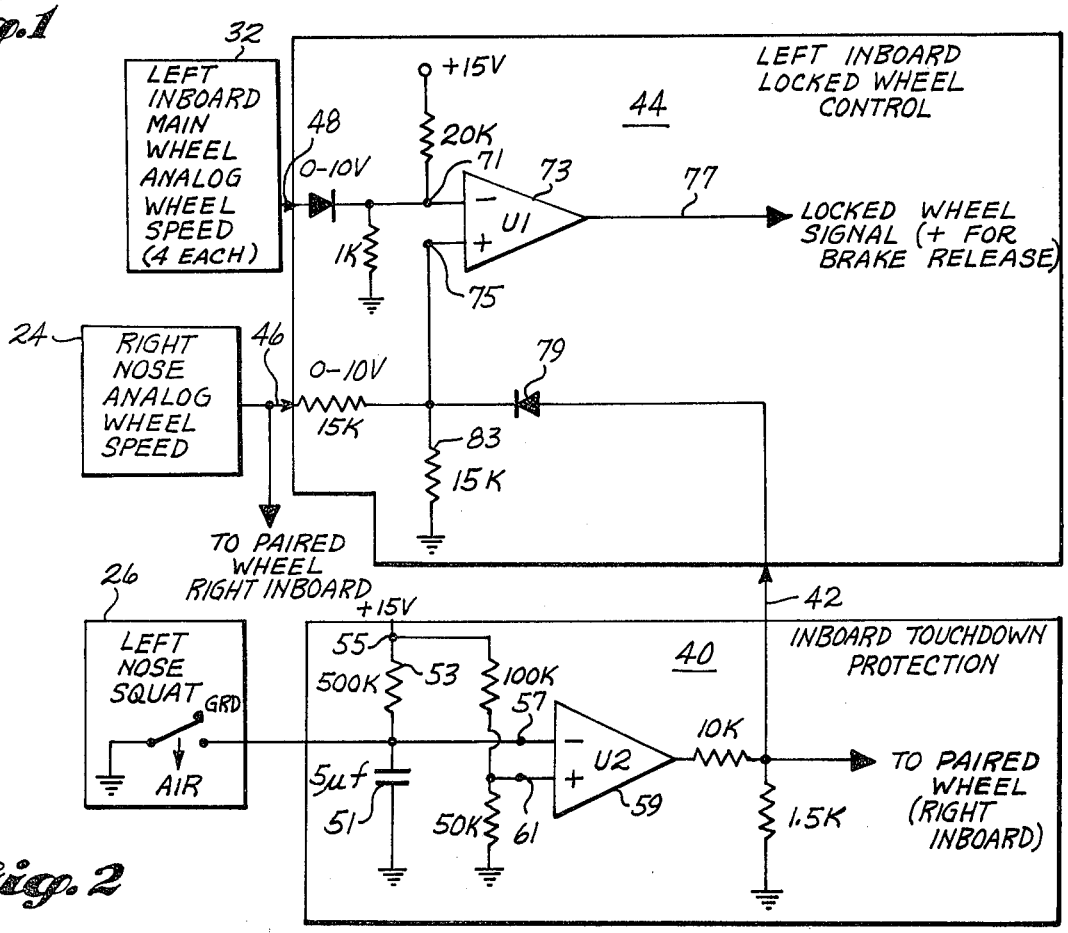
FIG. 2 is a circuit schematic of the inboard touchdown protection and left inboard locked wheel control circuits shown in block form in FIG. 1; and, FIG. 3 is a block diagram showing how a locked wheel signal as shown in FIG. 2 is coupled with anti-skid control signals downstream to control a main gear wheel brake.

Proceeding now to FIG. 2, it can be seen that when left nose gear squat switch 26 is in the open position (as shown), that is has switched from air to ground, 5 μfd capacitor 51 begins to charge through 500K resistor 53 connected to +15 volt d.c. potential connected to terminal 55. Approximately 2 seconds elapse subsequent to the aforementioned switch from air to ground when the voltage at negative (−) input terminal 57 of operational amplifier 59 (denoted U2) exceeds the voltage at positive (+) input terminal 61 and the output voltage from operational amplifier 59 reaches zero volts so that resistor 53 and capacitor 51 therefore are seen to provide a 2 second time delay for the opening of left nose gear squat switch 26.

In left inboard locked wheel control circuit 44, as long as the voltage at negative (−) input terminal 71 of operational amplifier 73 (denoted U1) exceeds the voltage at positive (+) input terminal 75, locked wheel signal 77 equals 0 volts. Left inboard main gear wheel speed voltage 48 must exceed squat switch voltage provided by operational amplifier 59 through diode 79 at input terminal 75 viz. approximately 2 volts to turn off operational amplifier 73 and remove brake release signal 77. Upon left inboard main wheel spin-up, the voltage at input terminal 71 is greater than the voltage at input terminal 75 and therefore, brake release signal 77 is removed. Left inboard main gear wheel speed voltage 48 has a range of 0 to 10 volts corresponding to a wheel speed of 0 to 200 knots and right nose gear wheel speed voltage 46 has a range of 0 to 10 volts corresponding to a wheel speed of 0 to 200 knots. Voltage comparator operational amplifiers 59 and 73 comprise μA 741 type operational amplifiers. Right nose gear wheel speed voltage 46 is divided by 15K resistor 81 and 30K resistor 83 to 66 percent of its value so that if main gear wheel speed voltage 48 drops below this level, operational amplifier 73 will switch on providing brake release signal 77. Touchdown protection signal 42 provides full brake release for wheels stopped (under 40 knots) while locked wheel support provides full brake release for wheels less than 66 percent of support wheel speed. Touchdown protection signal 42 is also transmitted as shown to the paired wheel (here the right inboard main wheel).

Figure 3:
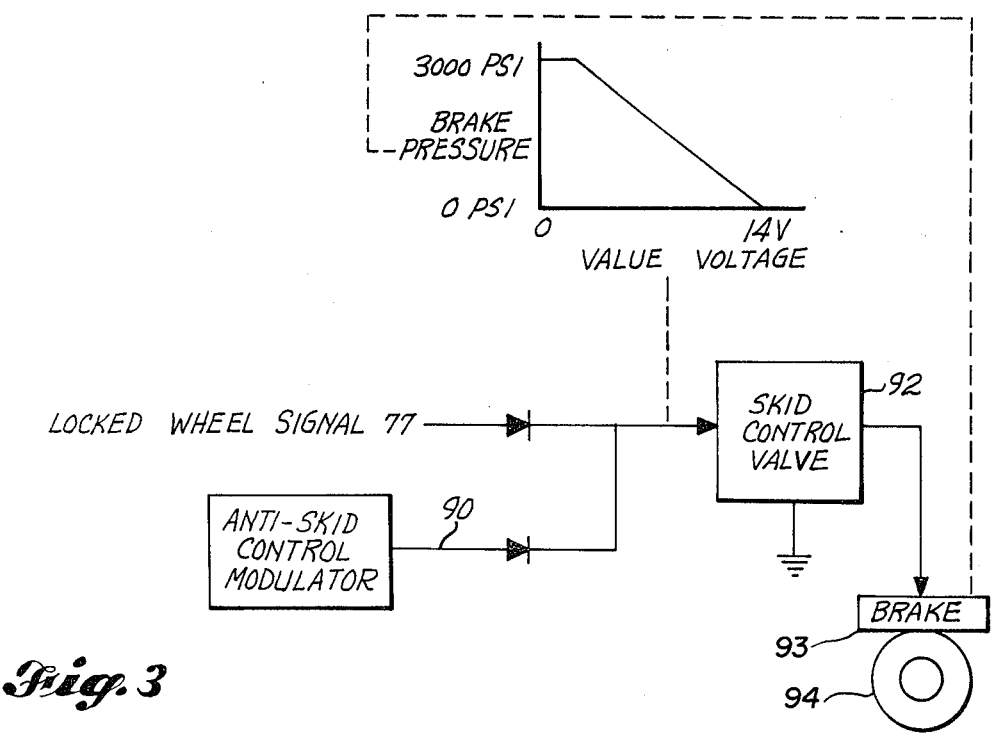

FIG. 3 shows locked wheel signal 77 and anti-skid control signal 90 coupled in parallel to skid control valve 92 for actuating left inboard main gear wheel brake 93 to control left inboard main gear wheel 94 with associated skid control valve versus brake pressure plot.

While left inboard protection circuit 40 and left inboard locked wheel control circuit 44 have been described it should be noted from the present system block diagram shown for a four main gear wheel aircraft in FIG. 1 that touchdown protection signal 42 is utilized in similar manner by right inboard locked wheel control circuit 144 of identical circuit design as hereinbefore described in respect to left inboard locked wheel control circuit 44. Also an outboard touchdown protection circuit 140 of identical circuit design as hereinbefore described in respect to left inboard touchdown protection circuit 40 is shown which maneuver utilizes right nose squat switch 28 instead of left nose squat switch 26 for air-ground logic. Similarly touchdown protection signal 142 corresponding to touchdown signal 42 is utilized by a pair of locked wheel control circuits in this instance left outboard locked wheel control circuit 244 and right outboard locked wheel control circuit 344 having left and right outboard wheel speed generators 30 and 36 respectively.

In the preceding, attention has been directed primarily to circuit functions and system description however for a further understanding of the present locked wheel control system, the operation thereof is now hereinafter described as follows:

Prior to landing, left nose squat switch 26 provides a ground level logic signal thereby turning on operational amplifier 59. With no main wheel speed, zero volts main gear wheel speed 48 results in a (positive polarity) locked wheel signal at the output of operational amplifier 73 which prevents brake application.

Upon touchdown, main gear voltage 48 due to spin-up results in a voltage at negative input terminal 71 of operational amplifier 73 which overrides the voltage at positive input terminal 75 of operational amplifier 73 due to touchdown protection signal 42 nose squat logic signal provided by left nose gear squat switch 26. If the left inboard main gear wheel 94 (of FIG. 3) should again lock up however, operational amplifier 73 would again provide locked wheel signal 77 to release the brake and allow spin-up again.

Upon nose wheel touchdown, nose squat switch 26 removes ground logic and allows capacitor 51 to charge up after about 2 seconds, the output of operational amplifier going low thereby removing touchdown protection signal 42 but the right nose wheel has since spun up providing analog wheel speed locked wheel support signal 24 which prevents main gear wheel 94 for decreasing in speed more than about 33 percent below nose wheel speed without providing brake release. The aforementioned 50 percent is below 60% deemed too great and about 40% which might provide locked wheel releases during normal skid conditions.

I claim:

1. In combination in an aircraft having left and right nose gear wheels, left and right inboard main landing gear wheels, and left and right outboard main landing gear wheels:

left and right nose gear squat switches for providing nose gear squat logic;

first means for generating signals representative of the wheel speed of said left nose gear wheel;

second means for generating signals representative of the wheel speed of said right nose gear wheel;

third means for generating signals representative of the wheel speed of said left outboard main landing gear wheel;

fourth means for generating signals representative of the wheel speed of said left inboard main landing gear wheel;

fifth means for generating signals representative of said right inboard main landing gear wheel;

sixth means for generating signals representative of said right outboard main landing gear wheel;

an inboard touchdown protection circuit coupled to said left nose gear squat switch for providing an inboard touchdown protection signal;

an outboard touchdown protection circuit coupled to said right nose gear squat switch for providing an outboard touchdown protection signal;

a left outboard locked wheel control circuit responsive to said first means, said third means, and said outboard touchdown protection signal for providing a left outboard locked wheel signal;

a left inboard locked wheel control circuit responsive to said second means, said fourth means, and said inboard touchdown protection signal for providing a left inboard locked wheel signal;

a right inboard locked wheel control circuit responsive to said second means, said fifth means, and said inboard touchdown protection signal for providing a right inboard locked wheel signal;

a right outboard locked wheel control circuit responsive to said first means, said sixth means, and said outboard touchdown protection signal for providing a right outboard locked wheel signal;

a first skid control valve responsive to said left outboard locked wheel signal for deactivating braking of said left outboard main landing gear wheel;

a second skid control valve responsive to said left inboard locked wheel signal for deactivating braking of said left inboard main landing gear wheel;

a third skid control valve responsive to said right inboard locked wheel signal for deactivating braking of said right inboard main landing gear wheel; and, a fourth skid control valve responsive to said right outboard locked wheel signal for deactivating braking of said right outboard main landing gear wheel.

* * * * *